Figure 1:
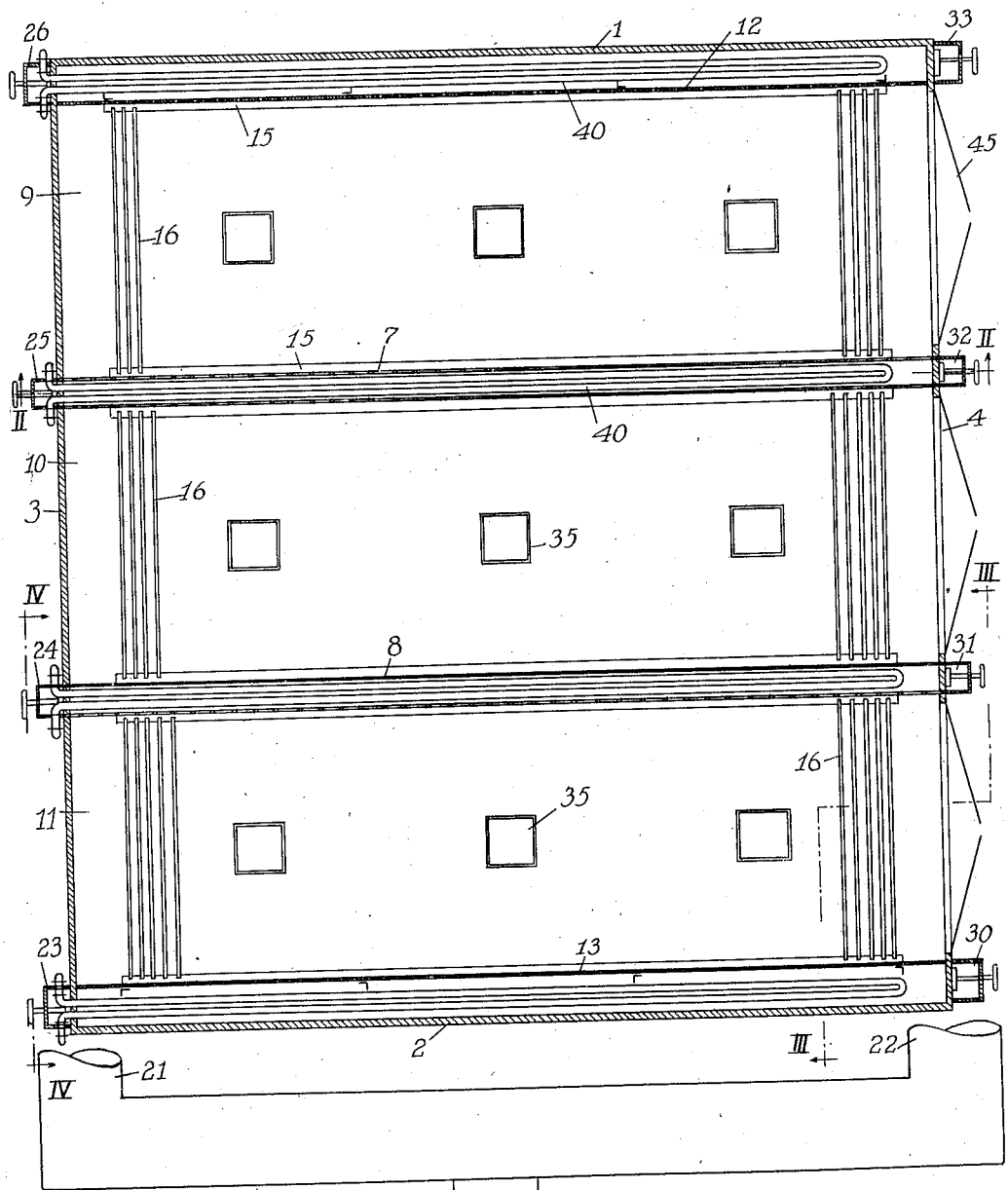

Sept. 3, 1929.          A. GALLERANI          1,726,661
TREATMENT OF SPAGHETTI
Filed Jan. 10, 1927          2 Sheets-Sheet 2
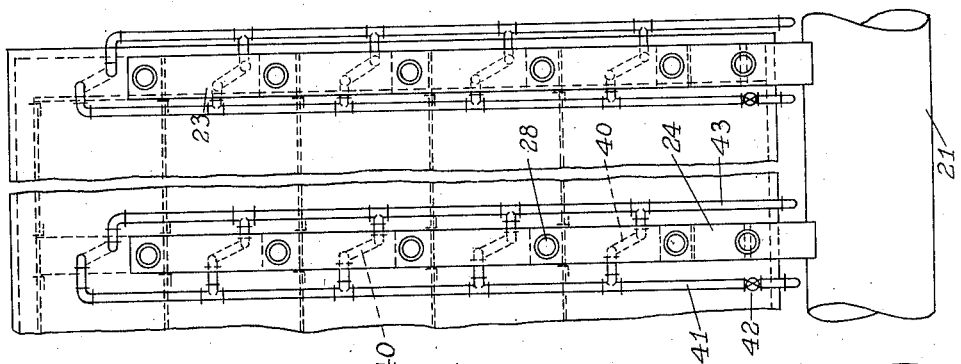
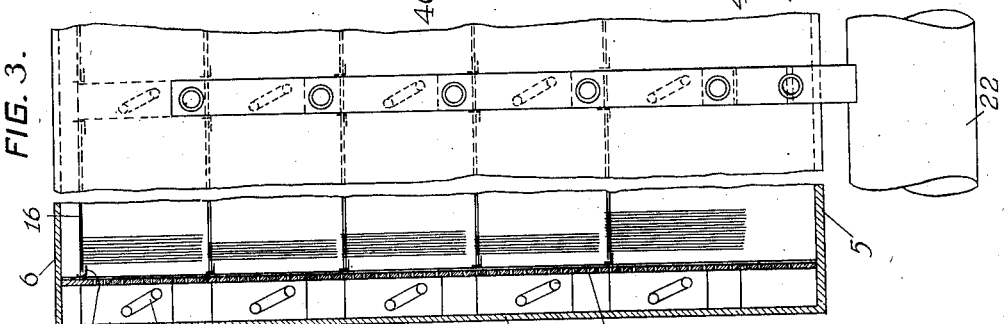
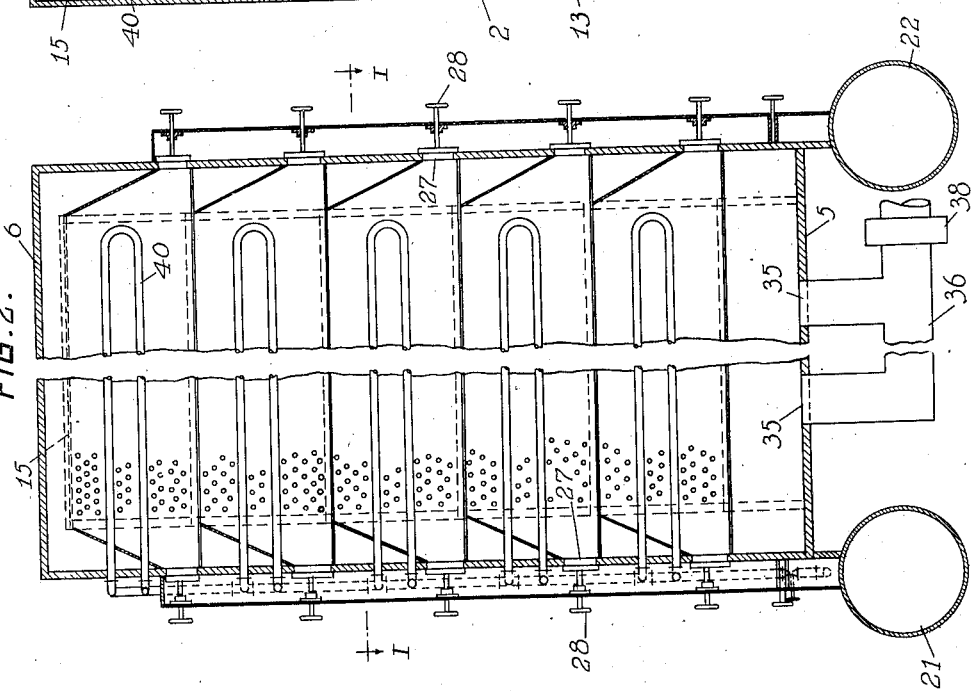
INVENTOR
Alexander Gallerani
by Winter Brown & Critchlow,
his attorneys.

Patented Sept. 3, 1929.

1,726,661

UNITED STATES PATENT OFFICE.

ALEXANDER GALLERANI, OF DORMONT, PENNSYLVANIA.

TREATMENT OF SPAGHETTI.

Application filed January 10, 1927. Serial No. 160,032.

The invention relates to the drying of spaghetti, macaroni, vermicelli, and like food products, all of which are made of flour, usually wheat flour, and are herein designated as string-like flour food products.

The object is to provide a method of and apparatus for drying such products, whereby large amounts may be quickly and effectively dried at a minimum cost and with maximum cleanliness.

Apparatus embodying this invention, and on which the method herein disclosed may be practiced, is illustrated in the accompanying drawings, of which Fig. 1 is a horizontal section of a drying room, the plane of view being indicated by the line I—I, Fig. 2; Fig. 2 a vertical sectional view of the room, the plane of view being inicated by the line II—II, Fig. 1; Fig. 3 a combined vertical section and elevation of a portion of the room, the plane of view being indicated by the broken line III—III, Fig. 1; and Fig. 4 an elevation of a portion of the room, the plane of view being indicated by the line IV—IV, Fig. 1.

In the practice of this invention string-like food products, such as spaghetti, macaroni and vermicelli, are suspended in a drying room which is closed to the ingress of air except that specially introduced into it, and washed air is introduced into the room for drying contact with the products. By using washed air for effecting the drying, all constituents in the air are removed which may have a contaminating effect upon the products,—a matter which materially improves the products.

During the initial drying period it is preferred to introduce washed drying air at normal room temperature. Thereafter the air used to complete the drying operation is at an elevated temperature.

For thus drying these food products there is provided a room which is divided into two or more compartments by vertical double walls, the members of which are perforated, and in the chambers formed by and between these members washed air is introduced. This air passes through the perforations of the double walls in small streams which project horizontally of the suspended products so that the products throughout the entire room and compartments may be subjected to uniform contact with drying air. Within the double walls there are preferably arranged steam or other heated fluid conduits for heating, as desired, the drying air before it passes through the perforations of the wall members.

For drying large amounts of these food products, they are preferably suspended in horizontal tiers upon racks provided for the purpose, and to the end that the drying operation may be varied to meet the requirements for effecting uniform drying throughout the entire room, provision is made for controlling the admission of drying air adjacent to each tier of the suspended food products.

Having reference now to the illustrative embodiment of the invention, the drying room is shown as having side walls 1 and 2, end walls 3 and 4, a floor or bottom 5, and a roof or top 6. Extending between the end walls there are two double-walled partitions 7 and 8 dividing the room into three compartments 9, 10 and 11. However, it will be understood that any desired number of partitions may be provided depending upon the desired size of drying rooms and compartment. The side walls 1 and 2 are of double-wall construction having inner members 12 and 13, respectively, which form air-receiving chambers with the side walls. The interior side wall members 12 and 13, and both the members forming the double wall partitions 7 and 8, are perforated for the passage of air from these chambers into the several compartments 9, 10 and 11.

In each compartment racks, which may be in the form of angles 15, are provided for supporting the string-like flour food products which are preferably laid over bars 16 the ends of which rest upon the outstanding flanges of the angles. As shown in the drawings sufficient racks are provided for forming five tiers of suspended food products.

As previously explained, washed drying air is led first to the chambers between the members of the double side walls and compartment-forming partitions, from which it it is introduced into the compartments through the perforations of the walls. This air passes through a washer 20 which may be of any well known or desired construction for the purpose of removing from it impurities and constituents which might contaminate the food products. After passing through the washer the air is preferably carried under any desired pressure to conduits 21 and 22 arranged adjacent to the end walls 3 and 4 of the room. From conduit 21 there are four conduits 23, 24, 25 and 26 leading upwardly outside of end wall 3, each being provided with an outlet 27 adjacent to each of the vertical tiers of food products, the outlet being controlled by a suitable valve 28. These outlets place the vertical conduits in communication with the ends of the chambers formed by the double side walls and partitions. In a similar manner vertical conduits 30, 31, 32 and 33 lead upwardly outside of end wall 4 adjacent to the opposite end of the air-receiving chambers formed by the double side walls and partitions. The drying air thus introduced into the double-walled chambers and from them into the drying compartments is preferably withdrawn from the room through suitable outlets 35 in floor 5, the outlets being connected to a conduit 36 in which there may be arranged a suction fan 38 for continuous or intermittent operation as desired.

Within each chamber formed by the double side and partition walls there are a plurality of pipes 40 through which steam, hot water or any other desired heated fluid may be caused to flow for heating the drying air in the chambers. Each of these pipes may be in the form of a loop, and preferably a pipe is arranged adjacent to each of the tiers of food products. As shown in Fig. 4, the heating fluid may be led to pipes 4 through a supply conduit 41 controlled by a valve 42, and the exhaust heating fluid may flow through a discharge pipe 43.

In effecting the drying operation, the undried stringlike food products are first suspended in tiers upon rods 16 engaged by rack angles 15, access to the room being had through doors 45 in side wall 4. Depending upon the amount of products to be dried, one or more compartments may be filled or partially filled, although for the most economical operation all of the several compartments should be entirely filled. During the preliminary drying operation washed drying air at normal room temperature is led into and through the compartments for a period of from six to ten hours. This air passes through washer 20, horizontal pipes 21 and 22, and vertical pipes 23, 24, 25 and 26 adjacent to side wall 3 and vertical pipes 30, 31, 32 and 33 adjacent to side wall 4. From these vertical pipes the air passes through openings 27 into the ends of the chambers formed by the double side and partition walls, and passes from the chambers through the perforations of inner side wall members 12 and 13 and both members of the double partition walls 7 and 8.

After the cold air is introduced, steam or other heating fluid is let into pipes 40 for heating the air to from about 90 degrees to 95 degrees F. The heated air flows in the same manner as explained with reference to the air at normal room temperature, and its flow is continued for a period of about fifty hours. Thereafter, air at normal room temperature is caused to flow for a period of about ten hours. The air which is thus introduced into the drying room is withdrawn from the bottom of the room through conduit 36 by suction fan 38 which may be operated continuously or intermittently as conditions may require. The room is of course provided with suitable thermometers and other apparatus to indicate the drying conditions in its various parts, and when the conditions are not uniform throughout the compartments forming the room, control valves 28 may be regulated to vary the supply of air at different tier elevations in the room.

The procedure which has been explained applies to a room about 12 feet high by about 14 feet long and about 15 feet wide divided into the number of compartments and tiers shown in the drawings. Such a room has a capacity of from about 10,000 to 15,000 pounds. However, it will be understood that the drying periods and dimensions of the apparatus thus explained are by way of example and not of limitation.

According to the provisions of the patent statutes, I have described the principle and operation of my invention and have illustrated and described the apparatus with which it may be practiced and which I now consider to represent the best embodiment of the invention. However, I desire to have it understood that, within the scope of the appended claims, the invention may be practiced otherwise than as specifically described and on apparatus other than that illustrated.

I claim as my invention:

1. Apparatus for drying string-like flour food products, comprising a room having double perforated vertical walls dividing it into drying compartments, and forming air-receiving chambers, means for suspending said products in said compartments, means for introducing drying air into said air-receiving chambers of said double walls for passage through the perforations thereof into said compartments, means for withdrawing said air from the floor of compartments, and means for varying the quantity of air supplied to different parts of the room to maintain uniform drying conditions throughout the room.

2. Apparatus for drying string-like flour food products, comprising a room having double perforated vertical walls dividing it into drying compartments, and forming air-receiving chambers, means for suspending said products in said compartments, means for introducing drying air into said air-receiving chambers for passage through the wall perforations into said compartments, means for exhausting said compartments through the floor, means arranged in said chambers for heating the air introduced therein, and means for varying the quantity of air supplied to different parts of the room to maintain uniform drying conditions throughout the room.

3. Apparatus for drying string-like flour food products, comprising a room having double perforated vertical walls dividing it into drying compartments, and forming air-receiving chambers, means for suspending said products in horizontal tiers in said compartments, means for introducing drying air into said air-receiving chambers for passage through the wall perforations into said compartments, means for exhausting said compartments through the floor, means arranged in said chambers for heating the air introduced in them, and means for varying the quantity of air supplied to different parts of the room to maintain uniform drying conditions throughout the room.

In testimony whereof, I sign my name.

ALEXANDER GALLERANI.